United States Patent [19]
Tanaka

[11] Patent Number: 6,024,474
[45] Date of Patent: Feb. 15, 2000

[54] VEHICLE LAMP HAVING A PLURALITY OF LAMP UNITS WITH A UNIFIED LENS ASSEMBLY WITH JOINING LEGS

[75] Inventor: Hitoshi Tanaka, Shizuoka, Japan

[73] Assignee: Koito Manufacturing Co., Ltd., Tokyo, Japan

[21] Appl. No.: 09/071,192

[22] Filed: May 4, 1998

[30]  Foreign Application Priority Data

May 2, 1997  [JP]  Japan ..................................... 9-114676

[51] Int. Cl.[7] .................................................. B60Q 1/00
[52] U.S. Cl. .......................... 362/544; 362/543; 362/496; 362/249
[58] Field of Search ................... 362/543, 544, 362/496, 235, 249

[56]  References Cited

U.S. PATENT DOCUMENTS

| | | | |
|---|---|---|---|
| 1,883,466 | 10/1932 | Bamford | 362/544 |
| 2,800,641 | 7/1957 | Falge et al. | 362/544 |
| 4,459,644 | 7/1984 | Baily | 362/80 |
| 4,774,637 | 9/1988 | Budde et al. | 362/61 |
| 5,001,610 | 3/1991 | Otaka | 362/61 |
| 5,055,983 | 10/1991 | Hunold et al. | 362/80 |
| 5,084,805 | 1/1992 | Goto | 362/61 |
| 5,172,972 | 12/1992 | Terao | 362/66 |
| 5,546,284 | 8/1996 | Harada | 362/61 |
| 5,552,969 | 9/1996 | Murakami | 362/61 |
| 5,566,057 | 10/1996 | Iwami | 362/61 |

*Primary Examiner*—Sandra O'Shea
*Assistant Examiner*—John A. Ward
*Attorney, Agent, or Firm*—Sughrue, Mion, Zinn, Macpeak & Seas, PLLC

[57]  ABSTRACT

A vehicle lamp comprises: a lamp body including a front opening and a plurality of lamp units which are juxtaposed; and a lens assembly formed by unifying the lenses of the lamp units, the lens assembly mounted on the front opening of the lamp body, wherein the lenses have joining legs at the boundaries thereof which are adapted to unify the lenses into the lens assembly such that the joining legs protrude towards the lamp body, and the lamp body has confronting surface portions which are confronted with the inner end portions of the joining legs and are able to reflect light.

6 Claims, 4 Drawing Sheets

VEHICLE LAMP HAVING A PLURALITY OF LAMP UNITS WITH A UNIFIED LENS ASSEMBLY WITH JOINING LEGS

BACKGROUND OF THE INVENTION

This invention relates to a combination lamp in which a plurality of lamps are provided as one unit, and more particularly to a vehicle lamp in which the lens of a plurality of lamps are provided as one unit.

A vehicle lamp has been proposed such that, as in the case of a rear combination lamp employed as a lamp of an automobile, a plurality of lamp chambers are formed in a lamp body, and the lenses of the lamps including the lamp chambers are provided as one unit which is mounted on an opening of the lamp body. In this case, the lenses of the lamps have joining legs along the peripheries thereof in such a manner that they are extended inwardly. The outer side surfaces of the joining legs are joined to one another, so that the plurality of lens are provided as one unit having one surface.

When, in the above-described vehicle lamp, the lenses provided as one unit are mounted on the opening of the lamp body, the joining legs of the lenses, which have been provided as one unit, are arranged at the boundaries of the lamp chambers formed in the lamp body. Therefore, when a part of a light beam from the light bulb in one of the lamp chambers is emitted to the lamp made up of an adjacent lamp chamber, sometimes the part of the light beam is applied to the lens through the lens joining leg arranged at the boundary, and passed through the lens, thus coming out of the vehicle lamp. When the part of the light beam thus applied comes out of the lens of the adjacent lamp, a part of the lamp which is not turned on may appear bright when it should not appear bright. This means that the vehicle lamp is not reliable. In the case where the adjacent lamps are different in color, the color of the lens of the lamp turned on mixes with the color of the lens of the lamp which is adjacent thereto; that is, the vehicle lamp looks more unattractive.

In the case where, the vehicle lamp is not turned on, and the insides of the lamp chambers of those lamps forming the vehicle lamp are observed, the lens joining legs and the inner surface of the lamp body can be observed. Since the lens joining legs have a different in reflection factor from the inner surface of the lamp body which is employed as a reflector, the lens joining legs look darker than the other parts of the lamp body. Thus, the lens joining legs can not be distinguished in external appearance from the shades which are formed by the uneven parts of the lamp body. Hence, when the vehicle lamp is not turned on, the vehicle lamp looks more unattractive.

SUMMARY OF THE INVENTION

An object of the invention is to provide a vehicle lamp which look attractive not only when it is turned on but also when it is turned off.

The present invention provides a vehicle lamp comprising: a lamp body including a front opening and a plurality of lamp units which are juxtaposed; and a lens assembly formed by unifying the lenses of the lamp units, the lens assembly mounted on the front opening of the lamp body, wherein the lenses have joining legs at the boundaries thereof which are adapted to unify the lenses into the lens assembly such that the joining legs protrud towards the lamp body, and the lamp body has confronting surface portions which are confronted with the inner end portions of the joining legs and are able to reflect light.

The provision of the confronting surface portions makes the vehicle lamp attractive at the joining legs, and increases the efficiency of utilization of the lens surfaces including the joining legs.

DETAILED DESCRIPTION OF THE PREFERRED EMBODIMENTS

A preferred embodiment of the invention will be described with reference to the accompanying drawings.

Figure 1:
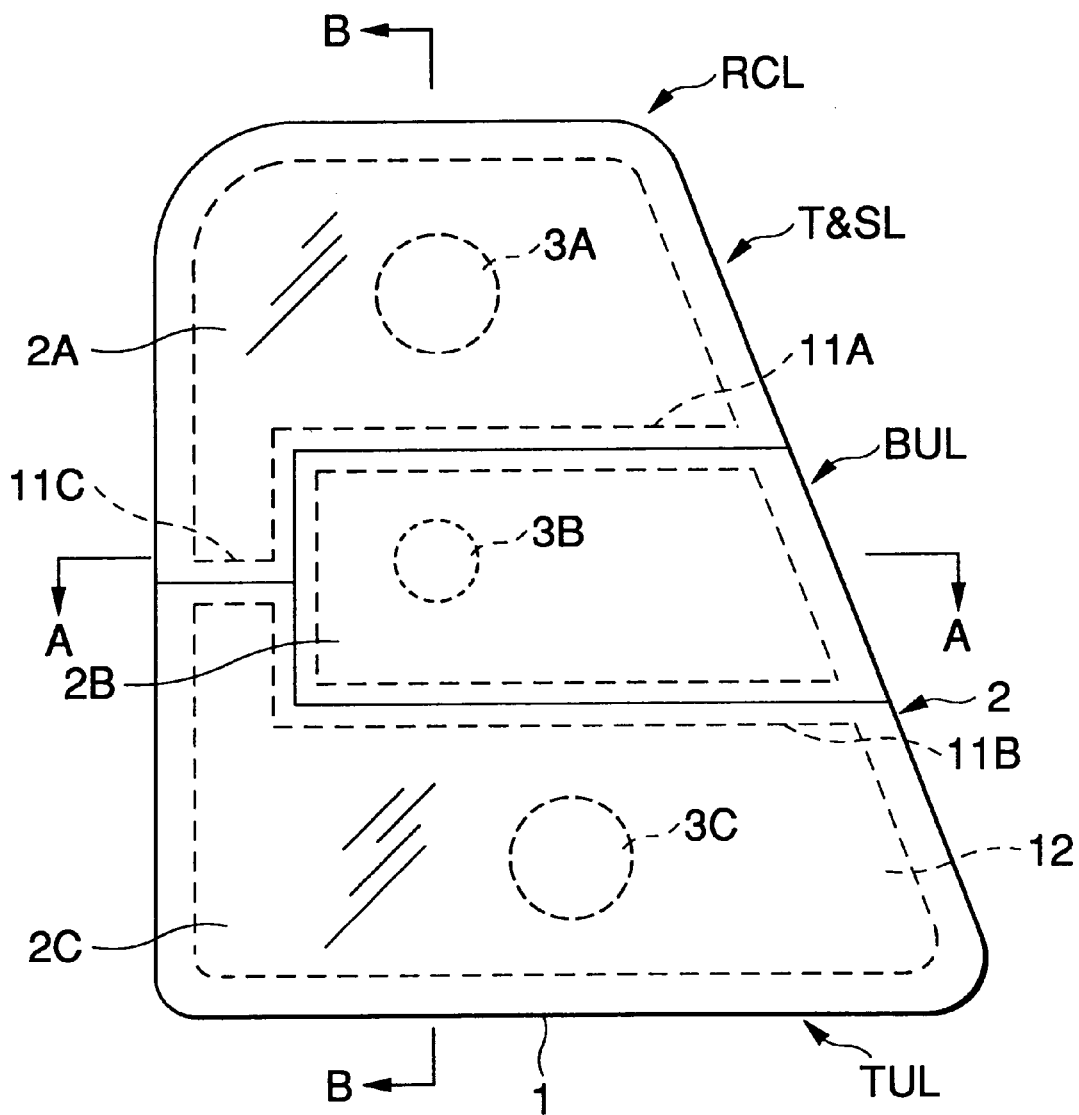
FIG. 1 is a front view of a vehicle lamp, which constitutes a preferred embodiment of the invention.
Figure 2:
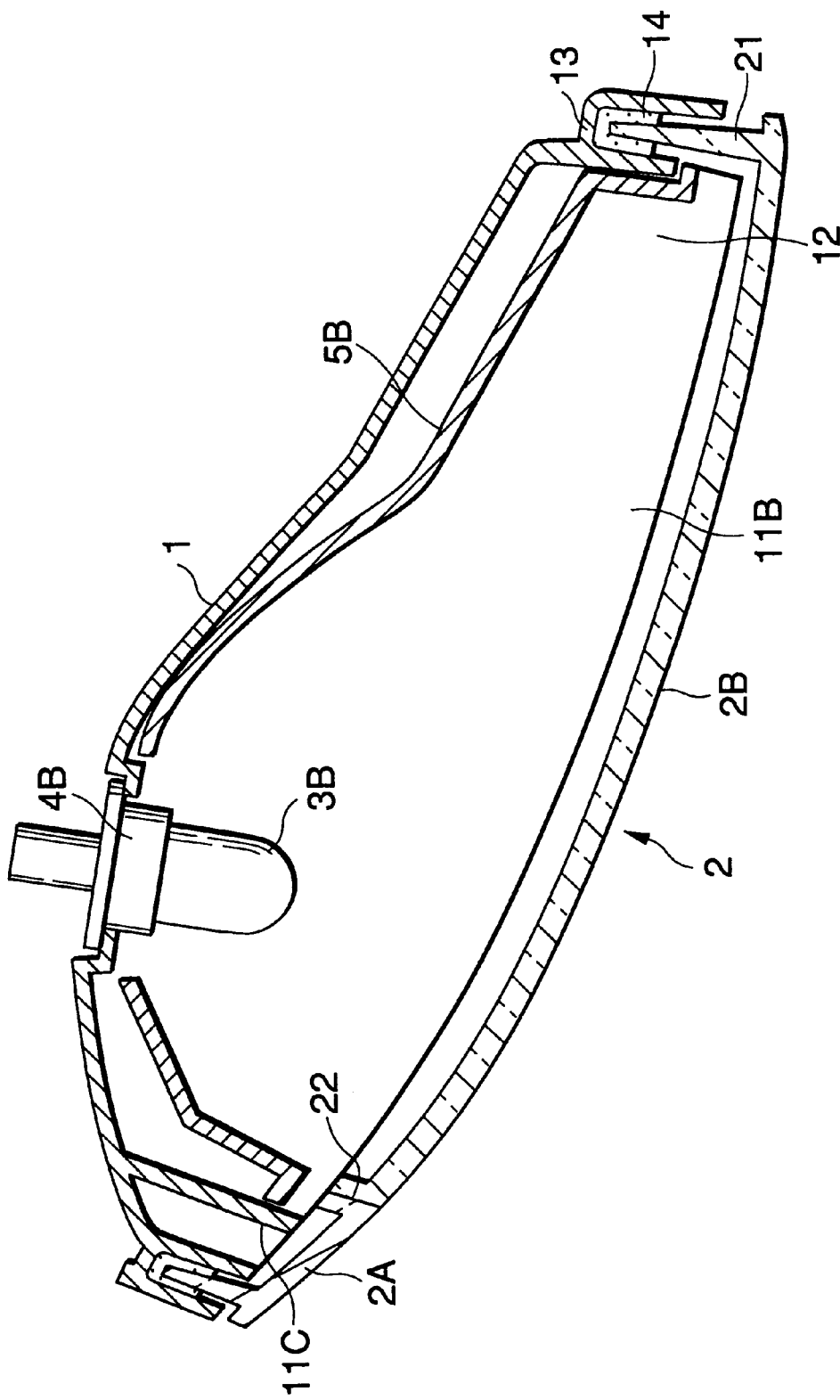
FIG. 2 is a sectional view taken along line A—A in FIG. 1.
Figure 3:
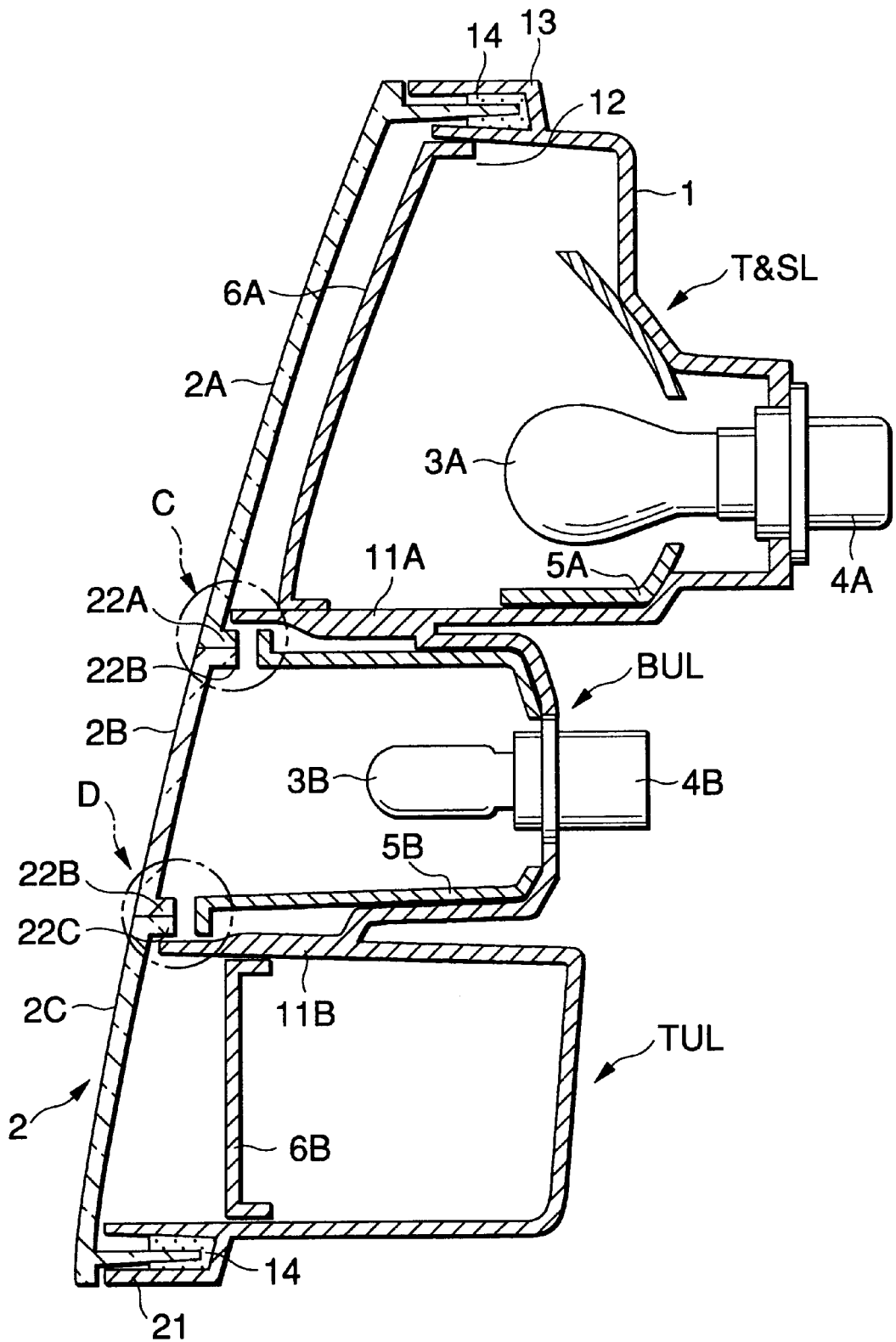
FIG. 3 is a sectional view taken along line B—B in FIG. 1.

FIG. 1 is a front view of an automobile rear combination lamp according to the embodiment of the invention. FIG. 2 is a sectional view taken along line A—A in FIG. 1. FIG. 3 is a sectional view taken along line B—B in FIG. 1.

The rear combination lamp RCL is of a three-stage (the upper, middle and lower stages) arrangement. A tail and stop lamp T&SL occupies the upper stage, a back-up lamp BUL occupies the middle stage, and a turn signal lamp TUL occupies the lower stage. A lamp body 1 is formed by molding resin. The inside of the lamp body 1 is divided into three regions to form shades 11A, 11B and 11C which define lamp chambers for the tail and stop lamp T&SL, the back-up lamp BUL, and the turn signal lamp TUL, respectively. The lamp body has a front opening 12, along the peripheral edge of which a seal groove 13. A lens assembly 2, on the inner surface of which lens steps are formed at suitable positions, are engaged with the front opening 12. The lens assembly 2 has a sealing leg 21 along the peripheral edge thereof. The sealing leg 21 is sealingly engaged with the seal groove 13 with a sealing agent 14 filled in the latter 13. The rear surface of the lamp body 1 has bulb mounting holes which are provided for the aforementioned lamp chambers, respectively. Light bulbs 3A, 3B and 3C are engaged with bulb sockets mounted in the bulb mounting holes. Thus, the bulbs 3A, 3B and 3C are arranged in the three lamp chambers, respectively. In FIGS. 1 through 3, only the bulb sockets 4A and 4B of the bulbs 3A and 3B are shown.

The inner surface of the lamp body 1 is formed into a light reflecting surface by the vacuum deposition of aluminum. For the tail and stop lamp T&SL, and the back-up lamp BUL, parboloidal reflectors 5A and 5B are provided in the lamp body 1, so that those reflectors 5A and 5B provides a suitable light distribution characteristic for the vehicle lamp. In addition, for the tail and stop lamp T&SL and the turn signal lamp TUL, light diffusing inner lenses 6A and 6B are fixedly provided in the respective lamp chambers in such a manner that they are located near the lens assembly 2.

The aforementioned lens assembly 2 is made up of three lenses 2A, 2B and 2C different in color from one another in correspondence to the three lamps. The lens 2A for the tail and stop lamp T&SL is made of red resin, the lens 2B for the back-up lamp BUL is made of colorless (white) resin, and the lens 2C for the turn signal lamp TUL is made of amber resin. In the regions where the lenses 2A, 2B and 2C are positioned adjacent to one another, lens joining legs 22A, 22B and 22C are formed integral with the lenses 2A, 2B and 2C in such a manner that they are protruded along the boundaries of the lenses. The side surfaces of the joining legs 22A, 22B and 22C are set in close contact with one another, and joined together, for instance, fusing into the lens assembly 2.

Figure 4A:
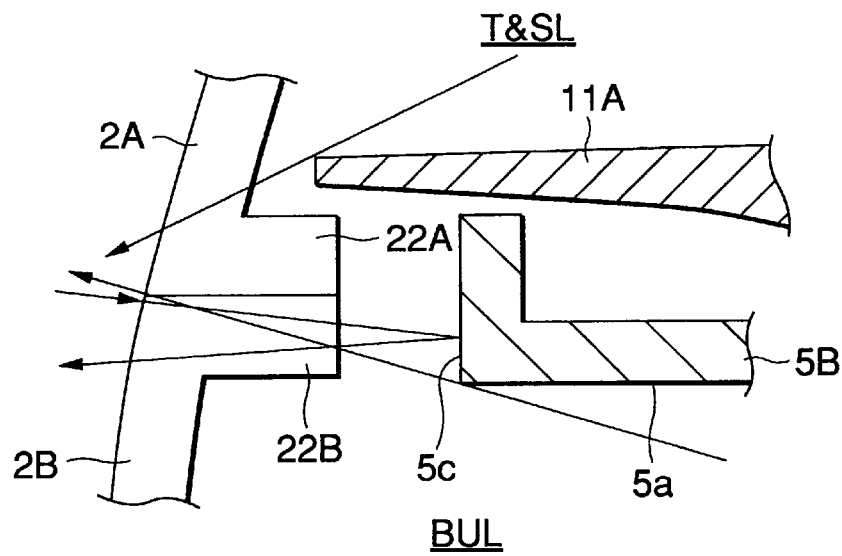
FIG. 4(a) is an enlarged diagram showing the region C of FIG. 3.
Figure 4B:
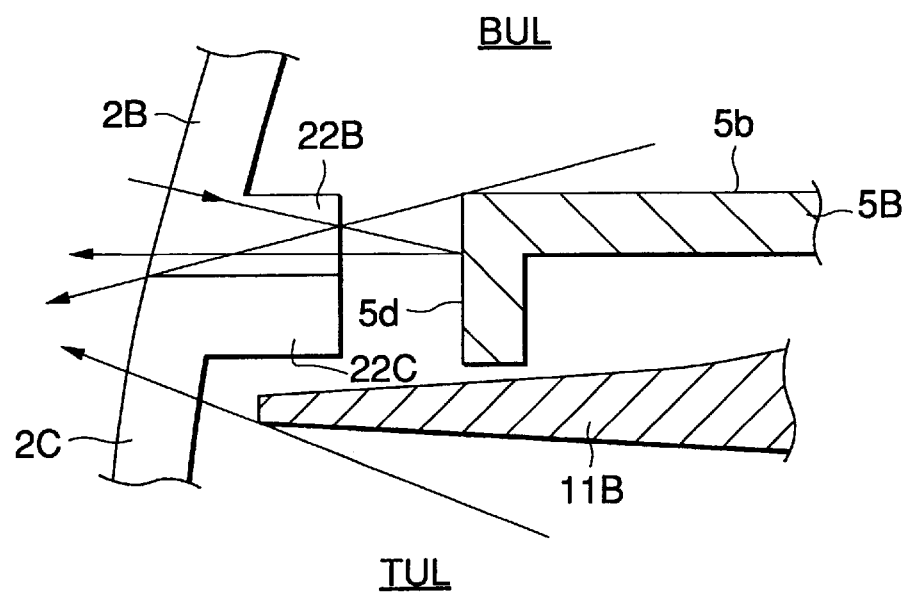
FIG. 4(b) is also an enlarged diagram showing the region D of FIG. 3.

FIG. 4(a) is an enlarged diagram of the region C of FIG. 3. The shade 11A, which divides the tail and stop lamp T&SL and the back-up lamp BUL from each other, is gradually smaller in wall thickness towards the tip end thereof, and extends along the inner surface of the joining legs 22A and 22B adapted to join the lenses 2A and 2B together and over the inner end of the joining legs 22A and 22B. Similarly, FIG. 4(b) is an enlarged diagram of the region D of FIG. 3. The shade 11B, which divide the back-up lamp BUL and the turn signal TUL from each other, is gradually small in wall thickness towards the tip end thereof, and extends along the inner surface of the joining legs 22B and 22C adapted to join the lenses 2B and 2C together and over the inner end of the joining legs 22B and 22C.

The reflector 5B, which is provided in the lamp chamber of the back-up lamp BUL in such a manner that it is located between the shades 11A and 11B, is as shown in FIGS. 4(a) and 4(b). That is, the upper and low surface portions of the reflector 5B are flat surface portions 5a and 5b, respectively. The front end portions of the flat surface portions 5a and 5b extend near to the inner ends of the joining legs 22A and 22B, and 22B and 22C, respectively. Furthermore, the outer end portions of the flat surface portions 5a and 5b are bent upwardly and downwardly, respectively. Hereinafter, the outer end portions thus bent will be referred to as confronting surface portions 5c and 5d which are confronted through small gaps with the inner end faces of the joining legs 22A and 22B, and 22B and 22C, respectively.

As is seen from the above description, in the lamps T&SL, BUL and TUL of the vehicle lamp thus designed, the light beams from the light bulbs 3A, 3B and 3C are reflected by the reflectors 5A and 5B, or by the inner surface of the lamp body 1, and passed through the lenses 2A, 2B and 2C (forming one lens assembly 2), thus being emitted outside. In this connection, let us consider the case where, in FIG. 4(a), the tail and stop lamp T&SL is on, and the backup lamp BUL is off. In this case, a part of the light beam emitted from the bulb 3A of the tail and stop lamp T&SL and reflected by the reflector 5A is sent towards the joining legs 22A and 22B through which the lens 2A and the lens 2B are joined together. However, since the end portion of the shade 11A extends over the inner surface of the joining leg 22A, the advance of the light beam from the bulb 3A into the joining leg 22A is prevented. Hence, the difficulty is eliminated that the light beam is applied to the lens 2B of the back-up lamp BUL through the joining legs 22A and 22B. This feature eliminates a so-called "false light on" that the lens 2B of the adjacent lamp BUL looks bright. Furthermore, in this case, the red light beam passed through the lens 2A of the tail and stop lamp T&SL is emitted from the white lens 2B of the back up lamp BUL; that is, the difficulty is eliminated that the back-up lamp BUL looks red.

Similarly, let us consider the case where, in FIG. 4(b), the turn signal TUL is on, and the backup lamp BUL is off. In this case, a part of the light beam emitted from the bulb 3C of the turn signal lamp TUL is sent towards the joining legs 22B and 22C through which the lens 2C and 2B are joined together. However, since the end portion of the shade 11B extends over the inner surface of the joining leg 22C, the advance of the light beam into the joining leg 22C is prevented. Hence, the difficulty is eliminated that the light beam is applied to the lens 2B of the back-up lamp BUL through the joining legs 22C and 22B. This feature eliminates a so-called "false light on" that the lens 2B of the adjacent lamp BUL looks bright. Furthermore, in this case, the amber light beam passed through the lens 2C of the turn signal lamp TUL is emitted from the white lens 2B of the back up lamp BUL; that is, the difficulty is eliminated that the back-up lamp BUL looks amber.

In the case where the back-up lamp BUL is turned on, since the reflector 5B has no function of preventing the incidence of a light beam to the joining leg 22B the light beam is applied to the joining leg 22B, so that the light beam is passed through not only the lens 2B but also the adjacent lenses 2A and 2C and the joining legs 22A and 22C thereof, thus radiating outside. However, since the back-up lamp BUL outputs a white light beam which is high in brightness, the difficulty is substantially eliminated that the leakage of light to the adjacent lamp (as was described above) causes the vehicle lamp look unattractive. On the other hand, it is possible to output a light beam from the region including the joining leg 22B present around the lens 2B, which makes it possible to utilize the whole area of the lens 2B to effect brighter irradiation.

In the case where all the lamps are off, in the tail and stop lamp T&SL and the turn signal lamp TUL the end portions of the shades 11A and 11B cover the inner surfaces of the joining lets 22A and 22C, and therefore the latter 22A and 22C cannot be observed from outside. And in the back-up lamp BUL, since the confronting surface portions 5c and 5d (which are extended vertical) are arranged with small spaces between the confronting surface portion 5c and the inner end faces of the joining leg 22A and 22B and between the confronting surface portion 5d and the inner end faces of the joining legs 22B and 22C, respectively, external light applied to the lamp body through the joining legs 22A, 22B and 22C is reflected by the confronting surface portions 5c and 5d, thus being returned outside. Hence the vehicle lamp is free from the difficulty that the inside of the lamp body can be observed through the joining legs 22A, 22B and 22C, and the difficulty that the joining legs 22A, 22B and 22C look dark. In the case of the back-up lamp BUL the inside of which can be readily observed from outside because the lens color is white, the upper and lower flat surface portions 5a and 5b are arranged in such a manner that they are substantially flush with the inner surfaces of the joining legs 22B. Therefore, when the inside is observed through the lens 2B, the inner surface of the lamp body look substantially uniform. That is, the vehicle lamp is free from the difficulty that the inside of the lamp looks uneven. Hence, when the vehicle lamp is off, it looks still attractive.

In the above-described preferred embodiment, the technical concept of the invention is applied to the combination lamp made up of the tail and stop lamp, the back-up lamp, and the turn signal lamp; however, the invention is not limited thereto or thereby. That is, the technical concept of the invention is applicable to a lamp in which a plurality of lamp units is provided with one lamp body divided into a plurality of lamp chambers, and lenses of those lamp units are provided as one lens assembly.

As was described above, in the vehicle lamp comprising: the lamp body including a plurality of lamp units which are juxtaposed; and the lens assembly formed by unifying the lenses of the lamp units, according to the invention, the lenses have joining legs at the boundaries thereof which are adapted to unify the lenses into the lens assembly in such a manner that the joining legs are protruded towards the lamp body, and the lamp body has the confronting surface portions which are confronted with the inner end portions of the joining legs.

The provision of the confronting surface portions eliminates the difficulty that the light passed through the joining legs is reflected so that the joining legs look dark, and allows the vehicle lamp to look attractive at the joining legs. Furthermore, the lens surfaces including the joining legs can be effectively utilized as light irradiating surfaces; that is, the lens surfaces are increased in the efficiency of utilization. Thus, the vehicle lamp of the invention is high in the quantity of irradiation light.

What is claimed is:

1. A vehicle lamp comprising:
    a lamp body including a front opening and a plurality of lamp units which are juxtaposed; and
    a lens assembly formed by unifying lenses of the lamp units, the lens assembly mounted on the front opening of the lamp body, wherein
    the lenses have joining legs at the boundaries thereof which are adapted to unify the lenses into the lens assembly such that the joining legs protrude towards the lamp body, and
    the lamp body has confronting surface portions which are confronted with inner end portions of the joining legs and are able to reflect light.

2. The vehicle lamp according to claim 1, wherein inner surface portions of the lamp body where the confronting surface portions are formed are substantially flush with inner surfaces of the joining legs.

3. The vehicle lamp according to claim 1, wherein:
    the lenses of adjacent lamp units are different in color from each other, and
    the lamp body includes boundary walls such that a front end of each boundary wall is provided at a boundary between the adjacent lamp units, and the boundary wall is extended along an inner surface of the joining legs of the adjacent lamp units.

4. The vehicle lamp according to claim 1, further comprising:
    a reflector, having an outer end portion and wherein the confronting surface portions are provided at the outer end portion.

5. The vehicle lamp according to claim 2, further comprising:
    a reflector, having an outer end portion and wherein the confronting surface portions are provided at the outer end portion.

6. The vehicle lamp according to claim 3, further comprising:
    a reflector, having an outer end portion and wherein the confronting surface portions are provided at the outer end portion.

* * * * *